(12) United States Patent
Maksimovic et al.

(10) Patent No.: US 12,368,189 B2
(45) Date of Patent: Jul. 22, 2025

(54) HETEROGENEOUS ENERGY STORAGE SYSTEM AND METHOD OF CONTROLLING A HETEROGENEOUS ENERGY STORAGE SYSTEM

(71) Applicants: The Regents of the University of Colorado, a body corporate, Denver, CO (US); Utah State University, North Logan, UT (US)

(72) Inventors: Dragan W. Maksimovic, Boulder, CO (US); Khurram K. Afridi, Boulder, CO (US); Regan A. Zane, North Logan, UT (US); Gregory L Plett, Boulder, CO (US); Michael Scott Trimboli, Boulder, CO (US)

(73) Assignees: The Regents of the University of Colorado, a body corporate, Denver, CO (US); Utah State University, Logan, UT (US)

( * ) Notice: Subject to any disclaimer, the term of this patent is extended or adjusted under 35 U.S.C. 154(b) by 389 days.

(21) Appl. No.: 16/079,957

(22) PCT Filed: Feb. 24, 2017

(86) PCT No.: PCT/US2017/019306
§ 371 (c)(1),
(2) Date: Aug. 24, 2018

(87) PCT Pub. No.: WO2017/147387
PCT Pub. Date: Aug. 31, 2017

(65) Prior Publication Data
US 2019/0067753 A1    Feb. 28, 2019

Related U.S. Application Data

(60) Provisional application No. 62/299,212, filed on Feb. 24, 2016.

(51) Int. Cl.
*H01M 10/42* (2006.01)
*B60K 6/28* (2007.10)
(Continued)

(52) U.S. Cl.
CPC .......... *H01M 10/4264* (2013.01); *B60K 6/28* (2013.01); *B60L 3/12* (2013.01); *B60L 58/19* (2019.02);
(Continued)

(58) Field of Classification Search
CPC .......... H01M 10/4264; H01M 2220/20; H02J 7/342; H02J 7/345; H02J 7/0014;
(Continued)

(56) References Cited

U.S. PATENT DOCUMENTS

| 5,559,402 A | 9/1996 | Corrigan, III |
| 5,849,426 A | 12/1998 | Thomas et al. |

(Continued)

FOREIGN PATENT DOCUMENTS

| CA | 2380957 A1 * | 10/2003 | ............... H02J 7/34 |
| CA | 2818450 C  * | 4/2020 | ............ B60L 15/007 |

(Continued)

OTHER PUBLICATIONS

Search Report and Written Opinion for PCT Application No. PCT/US2017/019306 dated May 5, 2017, 13 pages.

(Continued)

*Primary Examiner* — Richard Isla
*Assistant Examiner* — Manuel Hernandez
(74) *Attorney, Agent, or Firm* — Workman Nydegger

(57) ABSTRACT

A heterogeneous energy storage device and a method for controlling a heterogeneous energy storage device are provided. In one implementation, a heterogeneous energy storage device is provided. The heterogeneous energy storage (Continued)

device includes a first energy storage device, a second energy storage device and a capacitive device. The first energy storage device has a first energy capacity and a first power to energy ratio (P/E). The second energy storage device has a second total energy capacity and a second P/E ratio different from the first P/E ratio. The capacitive device is coupled in series with the first energy storage device, wherein the second energy storage device is coupled in parallel with the series combination of the capacitive device and the first energy storage device. In another implementation, a method of controlling a heterogeneous energy storage device including a first energy storage device and a second energy storage device is provided. In this implementation, the method includes: providing a capacitive device in series with the first energy storage; coupling the second energy storage device in parallel with the series combination of capacitive device and the first energy storage device, wherein the capacitive device provides DC decoupling between the first energy storage device and the second energy storage device.

23 Claims, 6 Drawing Sheets

(51) Int. Cl.
*B60L 3/12* (2006.01)
*B60L 58/19* (2019.01)
*B60L 58/20* (2019.01)
*B60L 58/21* (2019.01)
*B60L 58/22* (2019.01)
*H02J 7/00* (2006.01)
*H02J 7/34* (2006.01)

(52) U.S. Cl.
CPC ............... *B60L 58/20* (2019.02); *B60L 58/21* (2019.02); *B60L 58/22* (2019.02); *H02J 7/0014* (2013.01); *H02J 7/342* (2020.01); *H02J 7/345* (2013.01); *B60L 2210/10* (2013.01); *B60Y 2200/91* (2013.01); *B60Y 2200/92* (2013.01); *B60Y 2400/112* (2013.01); *B60Y 2400/114* (2013.01); *H01M 2010/4271* (2013.01); *H01M 2220/20* (2013.01); *Y02T 10/70* (2013.01); *Y02T 10/72* (2013.01)

(58) Field of Classification Search
CPC .. B60L 3/12; B60L 58/19; B60L 58/21; B60L 58/20; B60L 58/22; B60L 2210/10; B60K 6/28; Y02T 10/70; Y02T 10/72; B60Y 2200/91; B60Y 2200/92; B60Y 2400/112; B60Y 2400/114; Y02E 60/10
USPC .................................................. 320/118, 126
See application file for complete search history.

(56) References Cited

U.S. PATENT DOCUMENTS

| | | | | |
|---|---|---|---|---|
| 6,777,912 B1 * | 8/2004 | Yamada | .................. | B60K 6/28 320/118 |
| 7,595,597 B2 * | 9/2009 | King | ..................... | B60K 6/28 318/106 |
| 7,660,084 B2 * | 2/2010 | Kim | ..................... | H02J 7/345 361/91.1 |
| 8,339,056 B1 | 12/2012 | Xiong et al. | | |
| 8,723,474 B2 * | 5/2014 | Chiang | .................. | B60L 50/40 320/167 |
| 8,912,911 B2 | 12/2014 | Krug et al. | | |
| 11,655,024 B1 * | 5/2023 | Yan | ..................... | B60L 53/62 320/107 |
| 2002/0044637 A1 * | 4/2002 | Sasaki | ..................... | H02J 7/345 379/160 |
| 2003/0016902 A1 | 9/2003 | Turner et al. | | |
| 2003/0169022 A1 | 9/2003 | Turner et al. | | |
| 2007/0090808 A1 * | 4/2007 | McCabe | ................. | B60L 50/40 320/137 |
| 2008/0013224 A1 * | 1/2008 | Kim | ..................... | H02J 7/345 320/134 |
| 2010/0009052 A1 | 4/2010 | King et al. | | |
| 2010/0090525 A1 | 4/2010 | King et al. | | |
| 2010/0123352 A1 * | 5/2010 | Elleman | .................. | H02J 7/345 307/66 |
| 2011/0001352 A1 * | 1/2011 | Tamura | ................... | B60L 58/21 307/9.1 |
| 2012/0074894 A1 * | 3/2012 | Chen | ..................... | B60L 58/20 320/103 |
| 2012/0015652 A1 | 6/2012 | Cooley | | |
| 2012/0156528 A1 | 6/2012 | Cooley | | |
| 2012/0256583 A1 * | 10/2012 | Davis | ...................... | H02J 7/342 320/155 |
| 2014/0203738 A1 * | 7/2014 | Yamazaki | ......... | H01M 10/0525 320/124 |
| 2014/0032729 A1 | 11/2014 | Winkler et al. | | |
| 2014/0327298 A1 * | 11/2014 | Winkler | .................... | B60L 3/04 307/9.1 |
| 2016/0118902 A1 * | 4/2016 | Huang | .............. | H02M 3/33584 363/21.04 |
| 2016/0138550 A1 * | 5/2016 | Kirlew | .................... | H02J 7/345 290/38 R |
| 2016/0243960 A1 * | 8/2016 | Wood | .................... | H02J 7/1423 |
| 2018/0233929 A1 * | 8/2018 | Schultz | .................... | H02J 7/342 |
| 2019/0329663 A1 * | 10/2019 | Kominami | ............ | H02J 7/0013 |
| 2020/0376971 A1 * | 12/2020 | Takemoto | ............... | H02J 7/342 |

FOREIGN PATENT DOCUMENTS

| | | | | | |
|---|---|---|---|---|---|
| CN | | 101944756 A | * | 1/2011 | ................ B60L 1/00 |
| CN | | 103608579 A | * | 2/2014 | ............ B60L 11/005 |
| WO | WO-03088375 A2 | | * | 10/2003 | ................ H02J 7/34 |
| WO | WO-2004059815 A1 | | * | 7/2004 | ............ H02J 7/0029 |
| WO | WO-2011117189 A2 | | * | 9/2011 | ............ B60L 11/005 |
| WO | WO-2021020029 A1 | | * | 2/2021 | ............. B60R 16/03 |

OTHER PUBLICATIONS

International Preliminary Report on Patentability received for PCT Patent Application No. PCT/US17/19306, mailed on Sep. 7, 2018, 7 pages.

* cited by examiner

HETEROGENEOUS ENERGY STORAGE SYSTEM AND METHOD OF CONTROLLING A HETEROGENEOUS ENERGY STORAGE SYSTEM

CROSS-REFERENCE TO RELATED APPLICATIONS

This application is a 371 of PCT application no. PCT/US2017/019306 filed on Feb. 24, 2017, which claims the benefit of U.S. provisional application No. 62/299,212, filed Feb. 24, 2016, both of which are hereby incorporated by reference as though fully set forth herein.

BACKGROUND

Field

The instant invention relates to heterogeneous energy storage systems.

Background

Battery systems for electric vehicles (EV) and other applications can be improved in theory by combining power optimized cells and energy optimized cells rather than compromising with a single chemistry that must meet both the power and energy demands of the application. A conventional energy storage system (ESS) is optimized by selecting single-chemistry cells with specific power to energy ratio P*/E* equal to the application required power to energy (P/E) ratio, as shown in FIG. 1 for an example Li-ion NMC chemistry. FIG. 1 also shows a Ragone chart for the Li-ion LTO chemistry. An optimized heterogeneous combination of NMC and LTO cells with specific energy $E_{max}$ and specific power $P_{max}$, respectively, can meet the same power and energy requirements with the total system weight reduced by $1-E^*/E_{max}-(P/E) \times (E^*/P_{max})=48\%$ for the example considered in FIG. 1.

Even though heterogeneous energy storage systems offer considerable reduction in weight, in most cases, single chemistry solutions are used in industry due to multiple factors: (1) cells of different types operate with different voltages and current limits and are difficult to combine in series or parallel, (2) solutions presented in the literature to date either combine modules directly in parallel, requiring cell characteristics to match, utilize only one module type at a time, resulting in an underutilized system, or require power converters to operate as series buffers between heterogeneous modules, resulting in high cost, low efficiency, and increased size and weight, and (3) the control systems considered apply brute-force extensions of standard passive battery management systems (BMS) to all modules, resulting in increased cost. Hence, there is a need for an energy storage system architecture that achieves the benefits of combining different battery chemistries, without the additional cost and complexity of previously proposed methods.

BRIEF SUMMARY

To overcome these shortcomings, an energy storage system architecture is provided in some implementations that may realize the capabilities of heterogeneous energy and power optimized cells without the loss, complexity and cost associated with power conversion or power management functions.

In one implementation, for example, a heterogeneous energy storage device is provided. In this particular implementation, the heterogeneous energy storage device includes a first energy storage device, a second energy storage device and a capacitive device. The first energy storage device has a first energy capacity and a first power to energy ratio (P/E). The second energy storage device has a second total energy capacity and a second P/E ratio different from the first P/E ratio. The capacitive device is coupled in series with the first energy storage device, wherein the second energy storage device is coupled in parallel with the series combination of the capacitive device and the first energy storage device.

In another implementation, a method of controlling a heterogeneous energy storage device including a first energy storage device and a second energy storage device is provided. In this implementation, the method includes: providing a capacitive device in series with the first energy storage; coupling the second energy storage device in parallel with the series combination of capacitive device and the first energy storage device, wherein the capacitive device provides DC decoupling between the first energy storage device and the second energy storage device.

The foregoing and other aspects, features, details, utilities, and advantages of the present invention will be apparent from reading the following description and claims, and from reviewing the accompanying drawings.

DETAILED DESCRIPTION

In various implementations, an energy storage system architecture and method of controlling such a system is provided. For example, systems and methods that realize full capabilities of heterogeneous energy and power optimized cells without the loss, complexity and cost associated with power conversion or power management functions may be provided. In one implementation, for example, an architecture named Composite Heterogeneous Energy Storage System (CHESS) uses capacitors in addition to different types of battery cells (see FIG. 2 as an example implementation)

and may be used to achieve breakthrough performance. For example, the CHESS system of FIG. 2 offers more than 50% longer EV range for equal weight, volume, life and cost compared to commercial state-of-the-art EV battery systems.

In one particular implementation, for example, a power pack (comprising power optimized cells) is ac coupled to an energy pack (comprising energy optimized cells) using a capacitive device (e.g., a small capacitor module C). The capacitive device may include any type of capacitor(s), such as but not limited to an ultra-capacitor or some other type of capacitor (e.g., electrolytic, film, ceramic, mica, etc.) depending on the application. The capacitive device provides DC decoupling between cells of different types; hence, eliminating (or at least significantly reducing) circulating currents, while allowing power sharing between the power optimized and energy optimized cells. Although various implementations may refer to blocking or otherwise decoupling DC currents, minor leakage currents such as associated with various types of capacitors may be present as one of ordinary skill in the art would appreciate.

Figure 1:
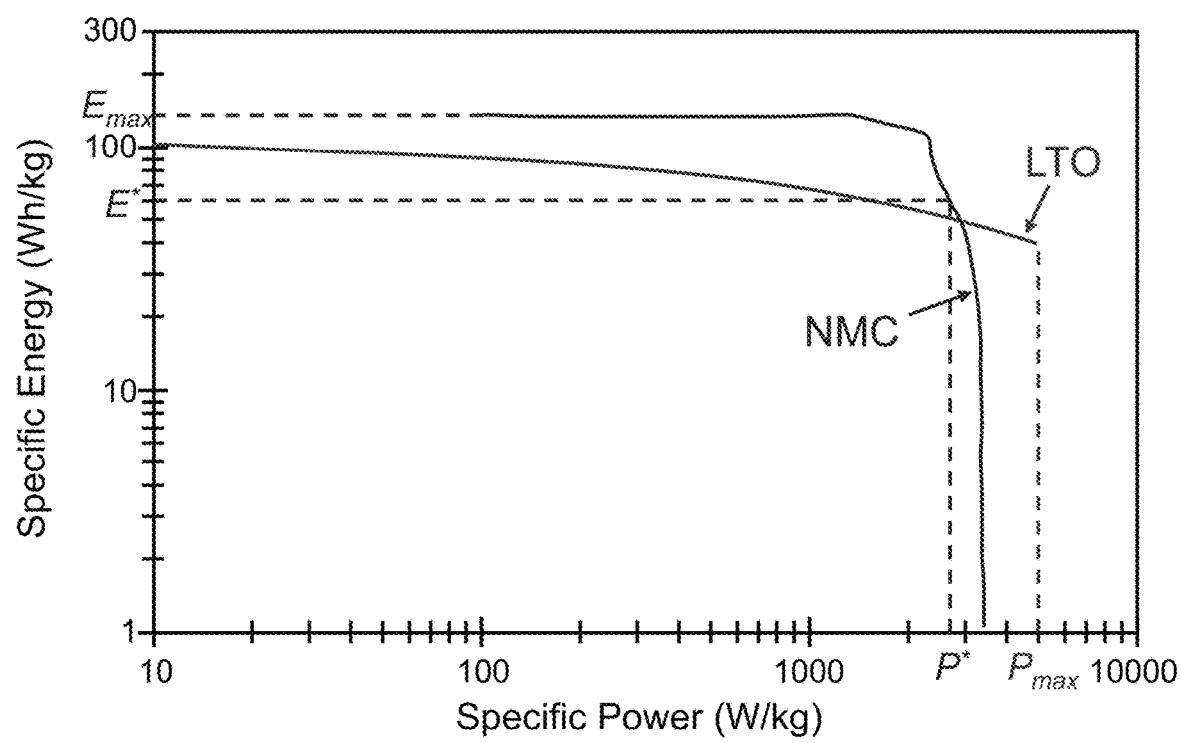
FIG. 1 shows optimization of a conventional energy storage system by selecting single-chemistry cells with a specific power-to-energy ratio equal to an application required power-to-energy ratio.
Figure 2:
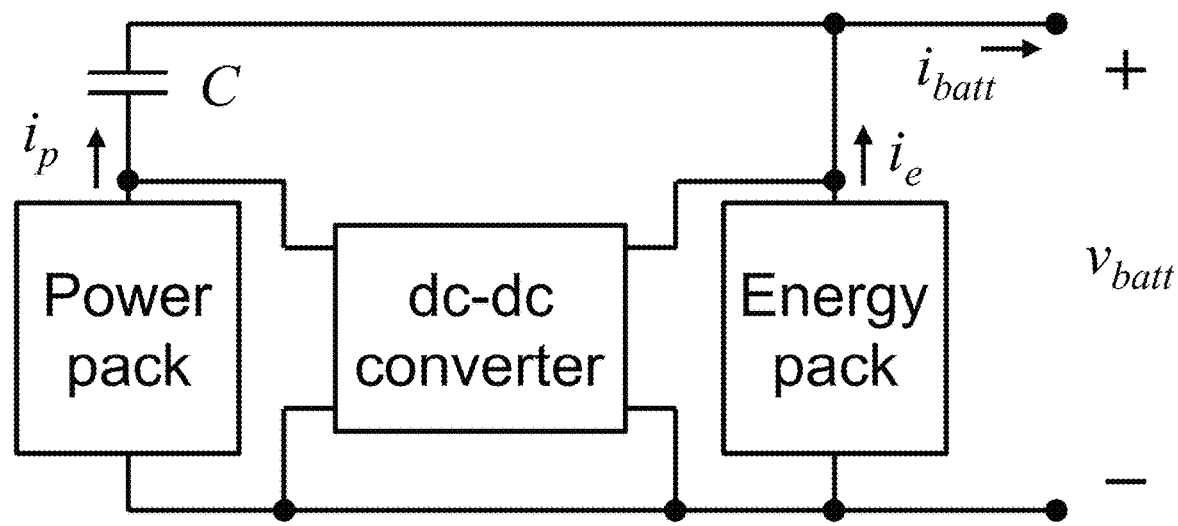
FIG. 2 shows an example architecture implementation of a Composite Heterogeneous Energy Storage System (CHESS).

In various implementations, a total battery current $i_{batt}$ is divided between the two packs naturally, requiring no additional series power converters or contactors. Energy balancing and battery management functions are achieved using a small, low-power, parallel-connected DC-DC converter, e.g., a modular battery management system (BMS) converter. In this approach, which is cost-neutral to existing BMS solutions, heterogeneous modules may be continuously balanced using enhanced electrochemical control for optimal utilization FIG. 2 shows an example architecture implementation of a Composite Heterogeneous Energy Storage System (CHESS) that combines an ac-coupled power pack and an energy pack in parallel, with a low-power dc-dc converter performing energy balancing and battery management functions. In this example implementation, FIG. 2 shows an approach that overcomes the three mentioned limitations of typical approaches to combine power optimized and energy optimized cells. In the CHESS approach implementation, for example, a power pack (comprising power optimized cells) is ac coupled to an energy pack (comprising energy optimized cells) using a capacitor module C (e.g., a small capacitor module). The capacitor may be an ultra-capacitor or some other type of capacitor (e.g., electrolytic, film, ceramic, mica, etc.) depending on the application. The capacitor C provides dc decoupling between cells of different types; hence, eliminating (or at least significantly reducing) circulating currents, while allowing power sharing between the power optimized and energy optimized cells. The total battery current $i_{batt}$ is divided between the two packs naturally, requiring no additional series power converters or contactors. Energy balancing and battery management functions are achieved using a small, low-power, parallel-connected dc-dc converter, e.g., a modular battery management system (BMS) converter. In this approach, which is cost-neutral to existing BMS solutions, heterogeneous modules are continuously balanced using enhanced electrochemical control for optimal utilization.

Figure 3A:
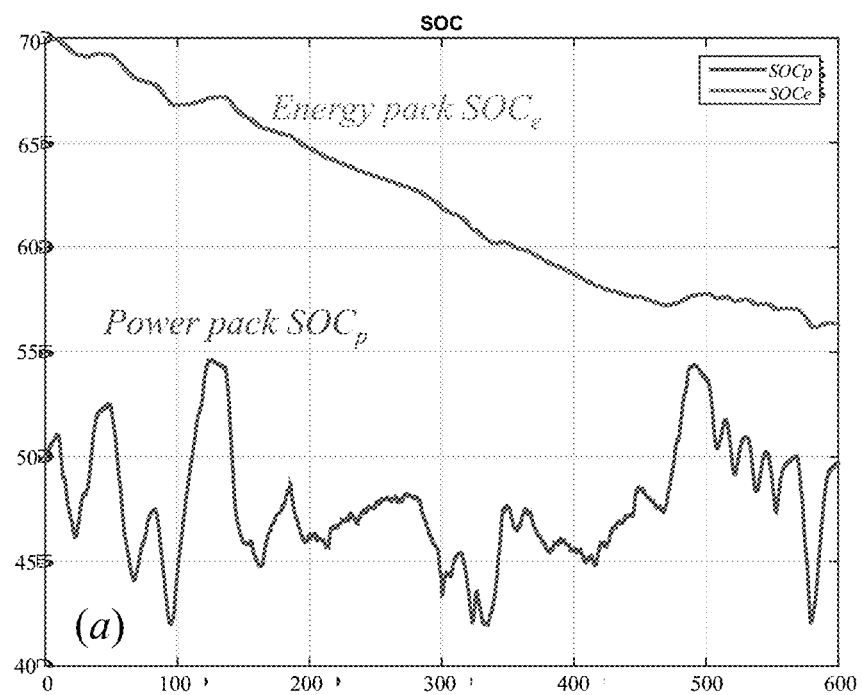
FIGS. 3A and 3B show simulation results for an example 16 kWh energy-optimized NMC pack and 0.9 kWh power-optimized LTO pack.
Figure 3B:
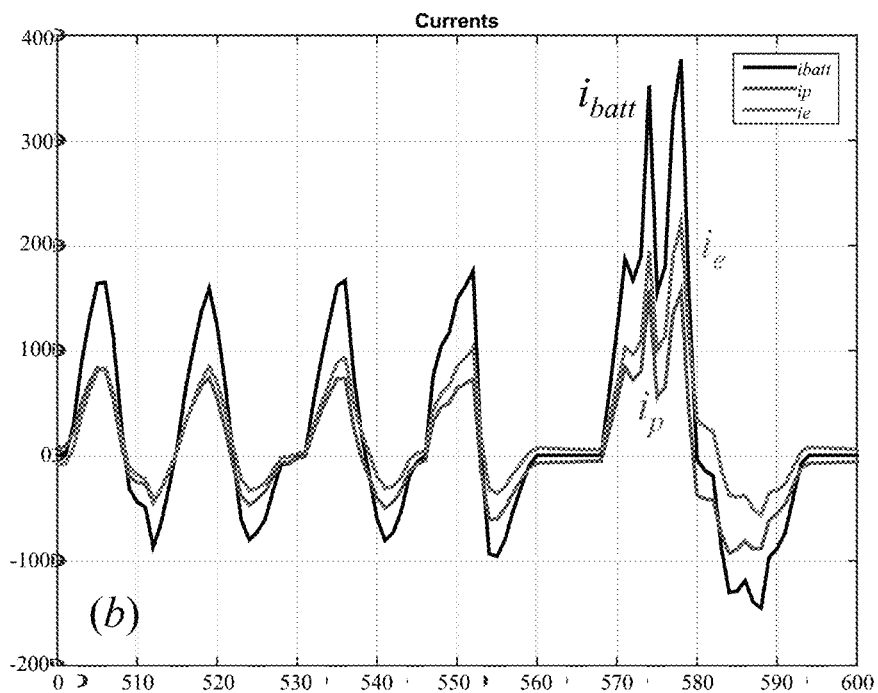

Operation of an example CHESS implementation using a 16 kWh energy-optimized NMC pack and 0.9 kWh power-optimized LTO pack is illustrated in FIG. 3 by simulations on a US06 cycle for a Chevy Volt sized vehicle. In this example, compared to the conventional 16 kWh system, weight is reduced by 40%. Equivalently, for the same weight, the EV range can be extended by more than 60%. Hence, a full scale plug-in hybrid-electric vehicle (PHEV) battery pack using the proposed approach and present-day cell technologies would have more than 50% longer EV range on the US06 cycle compared to a 7.6 kWh commercial PHEV pack of equal weight, volume, life and cost. Given the roadmap for energy and power optimized cells, even higher benefits can be expected in the future, with breakthrough impact on the EV Everywhere Grand Challenge targets.

System Design and Control

Compared to conventional single-chemistry systems, a heterogeneous energy storage system, such as a CHESS implementation, involves complex interactions among system modules, both in the design optimization phase, and during real-time operation. This may require application of electrochemical modeling expertise in the design phase, to come up with designs leading to optimum composition of energy, power, and capacitor modules, together with required voltage, current and power ratings of the dc-dc converter, as well as practical system cost/performance models. This may be done using electrochemical model-based controls to compute physics-based power limits on both packs; eking out maximum performance and life from each during dynamic operation under various temperatures and cycling conditions.

DC-DC Converter and BMS Realization

Various implementations of a CHESS concept system provide cost-effective realization of dc-dc converter and BMS functions. A modular BMS technology, which has been developed and demonstrated for single-chemistry systems, is also appropriate with suitable extensions to a more complex CHESS architecture.

Other Design Considerations

Note that the open circuit voltage of the power pack and the energy pack can be different in the CHESS architecture. This is made possible by the inclusion of a capacitor module in the CHESS architecture and is an advantage of various implementations. In these implementations, this allows the use of cells types with different nominal voltages in the power pack than those used in the energy pack. This also enables the number of series cells in the power pack and the energy pack to be different.

Description of Example Variants a. CHESS with Multiple Power Packs

Figure 4:
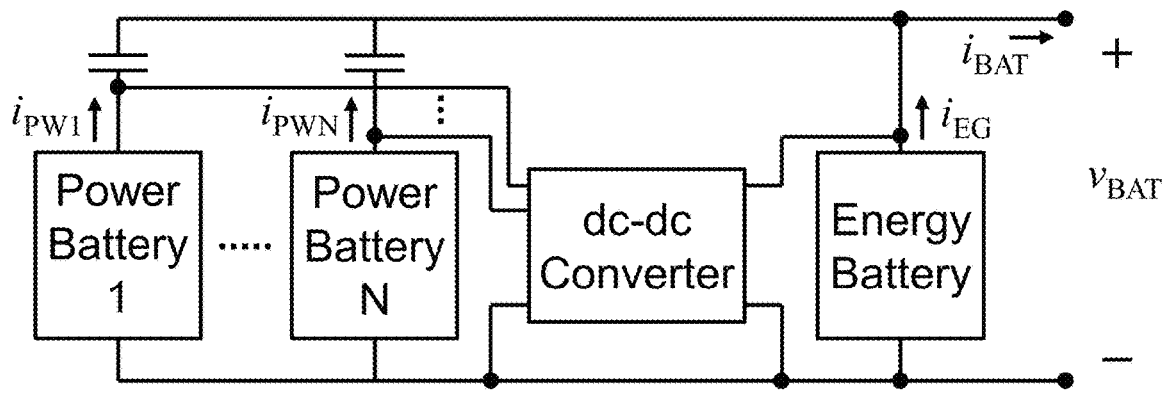
FIG. 4 shows another example implementation of a Composite Heterogeneous Energy Storage System (CHESS) architecture with multiple power battery packs.

In one implementation a composite heterogeneous energy storage system is provided with multiple power packs, connected to each other and the energy pack through ac coupling capacitor modules, as shown in FIG. 4. The power packs can be of the same or different cell chemistries, and have the same or different number of series and parallel connected cells.

b. CHESS with Series Switches

Figure 5:
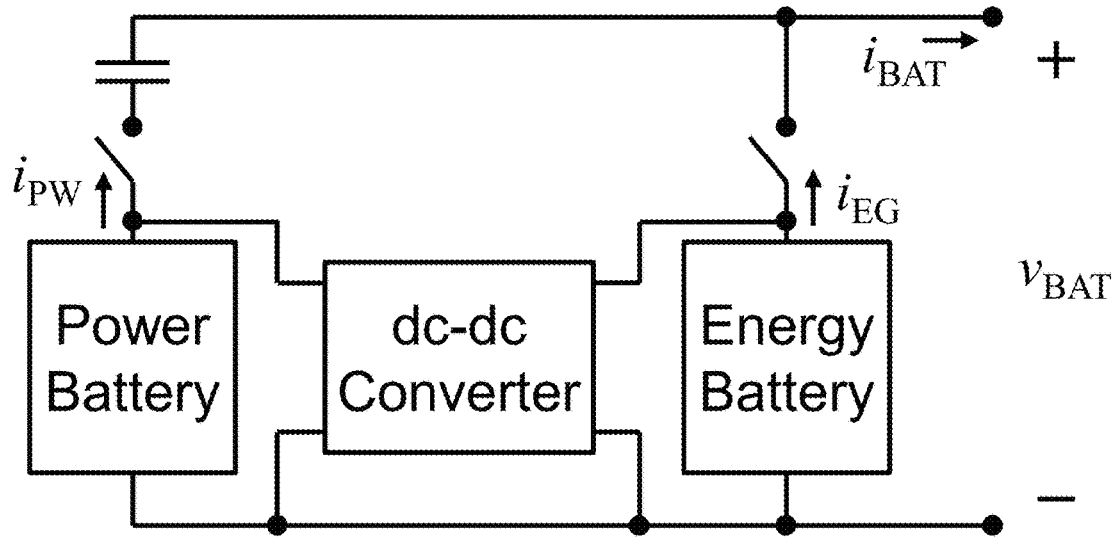
FIG. 5 shows yet another example implementation of a Composite Heterogeneous Energy Storage System (CHESS) architecture that includes switches connected in series with the power pack and the energy pack.

In another implementation, switches are included in series with the power pack and the energy pack, as illustrated in FIG. 5. In this implementation, an additional degree of control over the current flowing through each of the two packs is provided.

An extension of this variant is an architecture with multiple power and energy packs (potentially of same or different cell chemistries and same or different number of series and parallel connected cells) each separated from one another by a series switch. The power packs in this architecture could share an ac coupling capacitor module, or there could be a separate capacitor(s) for each of the power packs.

c. CHESS with Multiple Switched Capacitors

Figure 6:
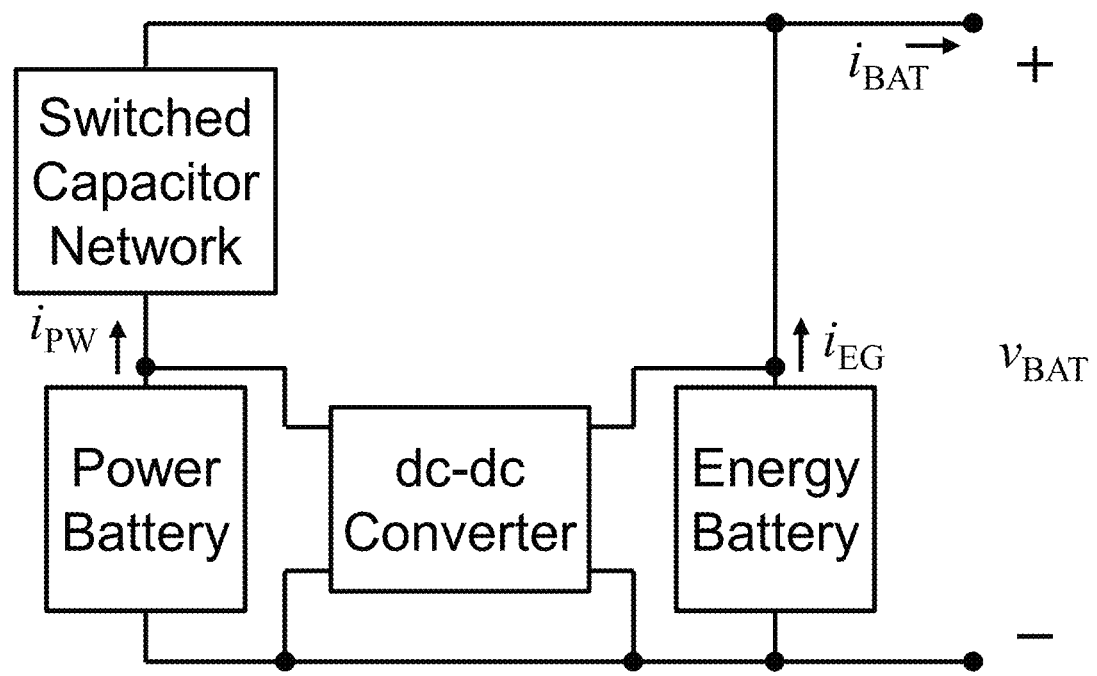
FIG. 6 shows another example implementation of a Composite Heterogeneous Energy Storage System (CHESS) architecture that includes a switched capacitor network connected in series with the power pack
Figure 7:
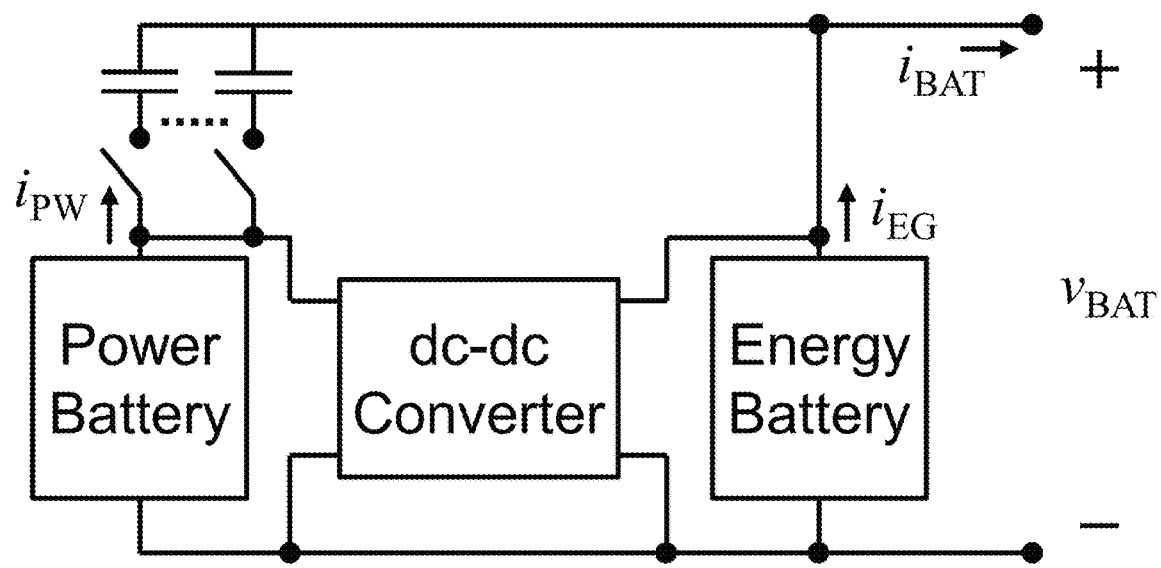
FIG. 7 shows an example implementation of a switched capacitor network connected in series with a power pack in a Composite Heterogeneous Energy Storage System (CHESS) architecture.

In another implementation, a switched capacitor network (with a plurality of capacitors and switches) in series with the power pack is provided, as illustrated in FIG. 6. An example implementation of this switched capacitor network connected as described above is shown in FIG. 7. Other combinations of switches and capacitors are also possible.

Although embodiments of this invention have been described above with a certain degree of particularity, those skilled in the art could make numerous alterations to the disclosed embodiments without departing from the spirit or scope of this invention. All directional references (e.g., upper, lower, upward, downward, left, right, leftward, rightward, top, bottom, above, below, vertical, horizontal, clockwise, and counterclockwise) are only used for identification purposes to aid the reader's understanding of the present invention, and do not create limitations, particularly as to the position, orientation, or use of the invention. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other. It is intended that all matter contained in the above description or shown in the accompanying drawings shall be interpreted as illustrative only and not limiting. Changes in detail or structure may be made without departing from the spirit of the invention as defined in the appended claims.

What is claimed is:

1. A heterogeneous energy storage device comprising:
   a first energy storage device having a first energy capacity and a first power to energy ratio (P/E) and including a positive contact and a negative contact;
   a second energy storage device having a second energy capacity and a second P/E ratio different from the first P/E ratio and including a positive contact and a negative contact, wherein the second energy storage device has a lower P/E ratio than the first energy storage device;
   a DC-DC converter comprising a first port and a second port, wherein a positive contact and a negative contact of the first port are coupled to the positive contact and the negative contact of the first energy storage device, respectively, and a positive contact and a negative contact of the second port are coupled to the positive contact and the negative contact of the second energy storage device, respectively, wherein the DC-DC converter is coupled in parallel to both the first energy storage device and the second energy storage device;
   a capacitive device having a first contact and a second contact, wherein the first contact is directly connected to a coupling point of the positive contact of the first energy storage device and the positive contact of the first port of the DC-DC converter, and the second contact is directly connected to a coupling point of the positive contact of the second energy storage device and the positive contact of the second port of the DC-DC converter; and
   an output port directly connected to the following:
      the positive contact of the second energy storage device, and
      the second contact of the capacitive device.

2. The heterogeneous energy storage device of claim 1, wherein the capacitive device is configured to block DC current from flowing through a series combination of the capacitive device and the first energy storage device.

3. The heterogeneous energy storage device of claim 1, wherein the capacitive device does not include a power converter circuit.

4. The heterogeneous energy storage device of claim 1, wherein the heterogeneous energy storage device requires no additional series connected power converters or contactors.

5. The heterogeneous energy storage device of claim 1, wherein the capacitive device comprises at least one of (i) at least one capacitor coupled in series with the first energy storage device and (ii) a combination of at least one capacitor and at least one switch coupled with the at least one capacitor.

6. The heterogeneous energy storage device of claim 1, wherein the DC-DC converter is adapted to provide at least one of (i) energy balancing between the first energy storage device and the second energy storage device and (ii) at least one battery management function for at least one of the first energy storage device and the second energy storage device.

7. The heterogeneous energy storage device of claim 1, wherein the first energy storage device comprises at least one power optimized cell and the second energy storage device comprises at least one energy optimized cell.

8. The heterogeneous energy storage device of claim 1, wherein the capacitive device provides DC decoupling between the first energy storage device and the second energy storage device and comprises at least one capacitor selected from the group comprising: an ultra-capacitor, a super-capacitor, an electrolytic capacitor, a film capacitor, and a mica capacitor.

9. The heterogeneous energy storage device of claim 1, further comprising:
   a third energy storage device having a third energy capacity and a third P/E ratio; and
   a second capacitive device having a first contact and a second contact, wherein the first contact of the second capacitive device is coupled to a positive contact of the third energy storage device.

10. The heterogeneous energy storage device of claim 1, wherein a first switch is coupled in series between the first energy storage device and the capacitive device and a second switch is coupled in series with the second energy storage device.

11. The heterogeneous energy storage device of claim 1, wherein the capacitive device comprises a switched capacitor network comprising a plurality of capacitors and switches in series with the first energy storage device.

12. The heterogeneous energy storage device of claim 1, wherein the heterogeneous energy storage device is coupled to an electric or hybrid electric vehicle.

13. A method of controlling a heterogeneous energy storage device, the method comprising:
    providing a heterogeneous energy storage device comprising:
       a first energy storage device having a first energy storage capacity and a first power-to-energy (P/E) ratio and including a positive contact and a negative contact,
       a second energy storage device having a second energy storage capacity and a second P/E ratio different from the first P/E ratio and including a positive contact and a negative contact, wherein the second energy storage device has a lower P/E ratio than the first energy storage device,
       a DC-DC converter comprising a first port and a second port, wherein a positive contact and a negative contact of the first port are coupled to the positive contact and the negative contact of the first energy storage device, respectively, and a positive contact and a negative contact of the second port are coupled to the positive contact and the negative contact of the second energy storage device, respectively, wherein the DC-DC converter is coupled in parallel to both the first energy storage device and the second energy storage device, a capacitive device having a first contact and a second contact, wherein the first contact is directly connected to a coupling point of the positive contact of the first energy storage device and the positive contact of the first port of the DC-DC converter, and the second contact is directly connected to a coupling point of the positive contact of the second energy storage device and the positive contact of the second port of the DC-DC converter; and an output port directly connected to the following:
the positive contact of the second energy storage device, and
the second contact of the capacitive device; and performing at least one of energy balancing between the first energy storage device and the second energy storage device and at least one battery management function for at least one of the first energy storage device and the second energy storage device via the DC-DC converter.

14. The method of claim 13, wherein the capacitive device is configured to block DC current from flowing through a series combination of the capacitive device and the first energy storage device.

15. The method of claim 13, wherein the capacitive device does not include a power converter circuit.

16. The method of claim 13, wherein the heterogeneous energy storage device requires no additional series connected power converters or contactors.

17. The method of claim 13, wherein the capacitive device comprises at least one of (i) at least one capacitor coupled in series with the first energy storage device and (ii) a combination of at least one capacitor and at least one switch coupled with the at least one capacitor.

18. The method of claim 13, wherein the heterogeneous energy storage device has a single output port.

19. The method of claim 13, wherein the capacitive device provides DC decoupling between the first energy storage device and the second energy storage device.

20. The method of claim 13, wherein the heterogeneous energy storage device further comprises:

a third energy storage device having a third energy capacity and a third P/E ratio; and a second capacitive device having a first contact and a second contact, wherein the first contact of the second capacitive device is the second contact of the capacitive device.

21. The method of claim 13, wherein a first switch is coupled in series between the first energy storage device and the capacitive device and a second switch is coupled in series with the second energy storage device.

22. The method of claim 13, wherein the capacitive device comprises a switched capacitor network comprising a plurality of capacitors and switches in series with the first energy storage device.

23. The method of claim 13, wherein the heterogeneous energy storage device is coupled to an electric or hybrid electric vehicle.

* * * * *